US012699617B2

(12) United States Patent
    Clark

(10) Patent No.: US 12,699,617 B2
(45) Date of Patent: Aug. 4, 2026

(54) DYNAMIC TROUBLESHOOTING INFORMATION FOR DISTRIBUTED COMPUTING SYSTEMS

(71) Applicant: RED HAT, INC., Raleigh, NC (US)

(72) Inventor: Michael Clark, Conway, AR (US)

(73) Assignee: Red Hat, Inc., Raleigh, NC (US)

( * ) Notice: Subject to any disclaimer, the term of this patent is extended or adjusted under 35 U.S.C. 154(b) by 251 days.

(21) Appl. No.: 18/387,916

(22) Filed: Nov. 8, 2023

(65) Prior Publication Data

US 2025/0147835 A1    May 8, 2025

(51) Int. Cl.
    *G06F 11/00*        (2006.01)
    *G06F 11/07*        (2006.01)

(52) U.S. Cl.
    CPC ........ *G06F 11/079* (2013.01); *G06F 11/0778* (2013.01)

(58) Field of Classification Search
    CPC ..... G06F 11/079; G06F 11/0778; G06F 11/07
    See application file for complete search history.

(56) References Cited

U.S. PATENT DOCUMENTS

| | | |
|---|---|---|
| 7,827,161 B2 | 11/2010 | Faihe |
| 10,410,219 B1 | 9/2019 | El-Nakib |

| | | | |
|---|---|---|---|
| 2011/0265175 A1* | 10/2011 | Bhat | G06F 11/3672 |
| | | | 726/19 |
| 2013/0007718 A1* | 1/2013 | Bates | G06F 11/362 |
| | | | 717/125 |
| 2019/0004890 A1 | 1/2019 | Venkataraman et al. | |
| 2019/0163515 A1* | 5/2019 | Sekhar Kakaraparthi | ................... |
| | | | G06F 9/453 |
| 2021/0303440 A1* | 9/2021 | Rodgers | G06F 11/3065 |
| 2023/0054681 A1* | 2/2023 | Dormieux | G06Q 30/0277 |

* cited by examiner

*Primary Examiner* — Bryce P Bonzo
(74) *Attorney, Agent, or Firm* — Kilpatrick Townsend & Stockton LLP

(57)    ABSTRACT

Techniques described herein relate to generating dynamic troubleshooting information for distributed computing systems. For example, a computer-implemented method can involve receiving a support request for an issue with respect to a computing environment. The support request can include a diagnostic file for the computing environment. In response, troubleshooting information associated with the issue or the computing environment can be identified in a support information database. A diagnostic software tool associated with the issue or the computing environment can be embedded within the troubleshooting information. Then, a graphical user interface displaying the troubleshooting information and including an interface element displaying a result generated by applying the diagnostic software tool to the diagnostic file can be output for use in resolving the issue.

20 Claims, 4 Drawing Sheets

Receive a support request for an issue with respect to a computing environment, the support request comprising a diagnostic file for the computing environment 402

Identify, in response to receiving the support request, a troubleshooting information associated with the issue or the computing environment in a support information database 404

Embed a diagnostic software tool associated with the issue or the computing environment within the troubleshooting information 406

Output a graphical user interface displaying the troubleshooting information and comprising an interface element displaying a result generated by applying the diagnostic software tool to the diagnostic file for the computing environment for use in resolving the issue 408

100

120

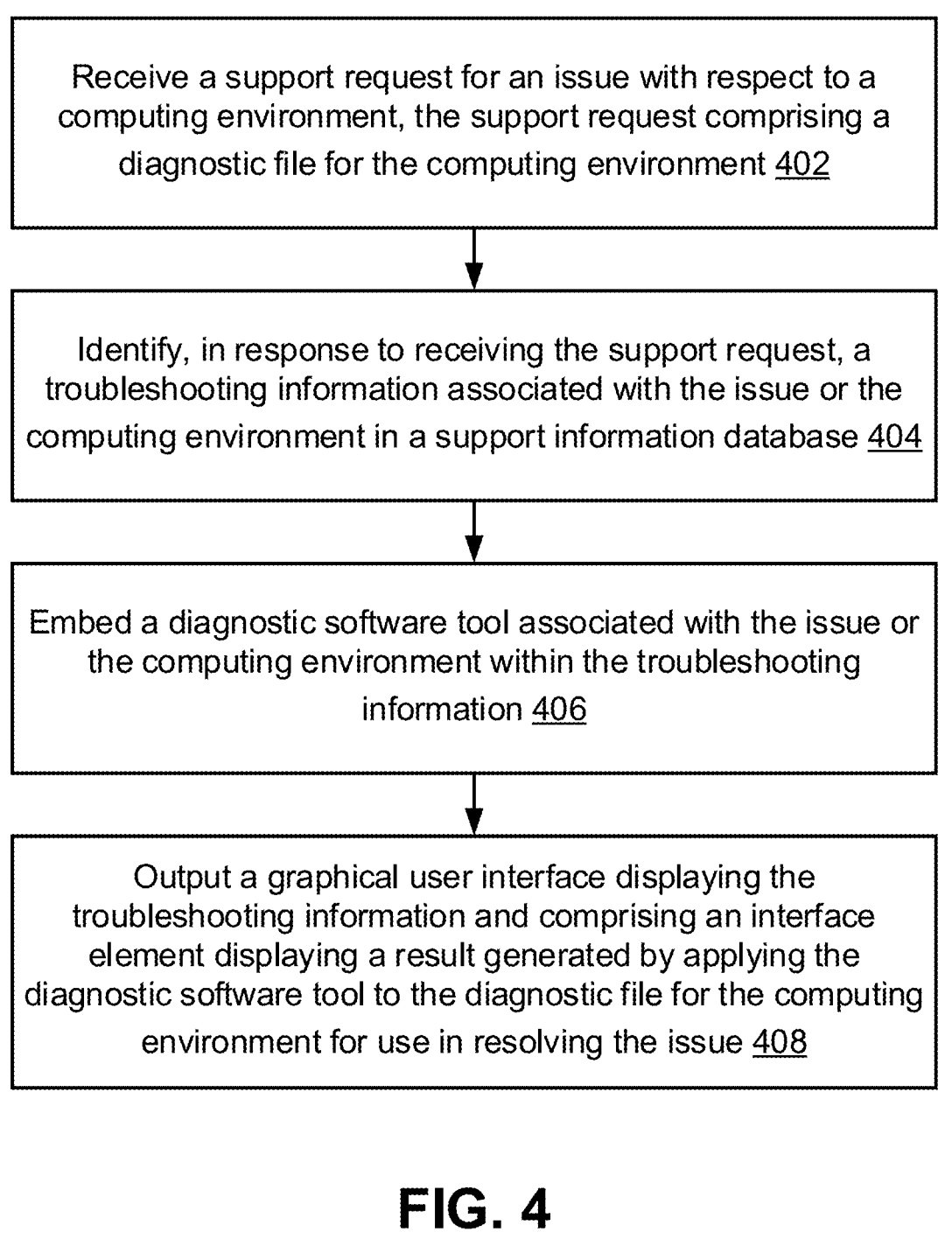

Receive a support request for an issue with respect to a computing environment, the support request comprising a diagnostic file for the computing environment 402

Identify, in response to receiving the support request, a troubleshooting information associated with the issue or the computing environment in a support information database 404

Embed a diagnostic software tool associated with the issue or the computing environment within the troubleshooting information 406

Output a graphical user interface displaying the troubleshooting information and comprising an interface element displaying a result generated by applying the diagnostic software tool to the diagnostic file for the computing environment for use in resolving the issue 408

FIG. 4

DYNAMIC TROUBLESHOOTING INFORMATION FOR DISTRIBUTED COMPUTING SYSTEMS

TECHNICAL FIELD

The present disclosure relates generally to distributed computing systems. More specifically, but not by way of limitation, this disclosure relates to dynamic troubleshooting information for distributed computing systems.

BACKGROUND

Distributed computing systems (e.g., cloud computing systems, data grids, and computing clusters) have recently grown in popularity given their ability to improve flexibility, responsiveness, and speed over conventional computing systems. A distributed computing environment may include several nodes (e.g., physical machines) that may be physically separate but communicatively coupled to one another via a network, such as a local area network or the Internet.

BRIEF DESCRIPTION OF THE DRAWINGS

FIG. 4 is a flowchart of a process for generating dynamic troubleshooting information for a computing system, according to one aspect of the present disclosure.

DETAILED DESCRIPTION

Figure 1:
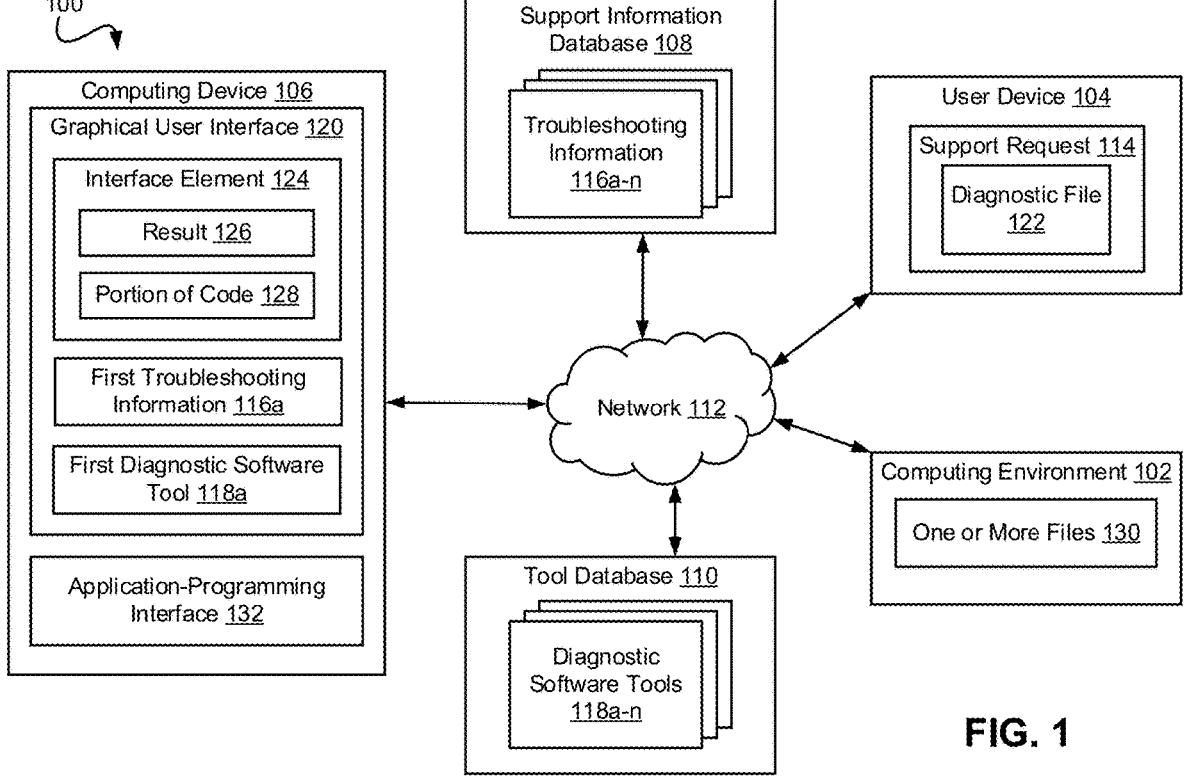
FIG. 1 is a block diagram of an example of a system for generating dynamic troubleshooting information for a computing environment, according to one aspect of the present disclosure.

A support desk service (e.g., for a cloud service provider) may utilize Knowledge-Centered Service techniques to document and track solutions to customer issues. This can involve creating and updating a support information database of information (e.g., articles, modules, lists, or the like) that outline issues, environmental factors, diagnostics, root causes, resolutions, and any other helpful troubleshooting information for a particular computing environment. Some information may be frequently accessed by support personnel assisting different users having the same issue with a similar computing environment. In some cases, support personnel may manually utilize scripts, applications, or other diagnostic tools as part of diagnosing, detecting, or resolving issues with computing environments. But such diagnostic tools may not be integrated with the support information database and may therefore be inefficient in capturing troubleshooting information. Even if support information for an issue is updated by the support personnel recommending that a particular diagnostic tool can be used to troubleshoot, another support personnel accessing the support information at a later time may have difficulties locating or executing the diagnostic tool.

Some examples of the present disclosure can overcome one or more of the above mentioned problems by generating dynamic troubleshooting information with automatically executed diagnostic software tools used to diagnose or detect software or hardware issues. For example, relevant diagnostic software tools can be identified and embedded within a troubleshooting article (e.g., the support information) for a particular issue. Each time the troubleshooting article is accessed (e.g., selected on a webpage) for a new support request, the embedded diagnostic software tool can be executed on a file uploaded by a user. The webpage generated for the troubleshooting article can include not only the previous documentation providing support for the issue, but results from applying the diagnostic software tool to the user's files as well. Thus, support documentation can be dynamically updated with information specific to a particular user's computing environment.

Embedding the diagnostic tools into text of troubleshooting information to be automatically executed when a diagnostic file (e.g., configuration files, system details, or any other relevant diagnostic information) is submitted can allow support personnel with different skill levels to provide support for issues with computing environments. Support personnel without the expertise necessary to locate or manually use the diagnostic tools may still benefit from the information produced by embedded diagnostic tools. In some examples, the troubleshooting information displaying results from embedded diagnostic tools can be accessed by the users themselves in response to uploading diagnostic files, reducing or eliminating help needed from support personnel. Thus, embedding results of diagnostic tools directly into the displayed text of the troubleshooting information can significantly reduce time involved in diagnosing and resolving issues, which can reduce latency and improve processing power of the computing environment.

In a particular example, a user may submit a support request for a computing cluster with network connection issues. The support request can include one or more diagnostic files capturing data for the computing cluster. For example, the diagnostic files can include the running kernel version, loaded modules, and system and service configuration files for the computing cluster. In some examples, support personnel assigned to the support request can identify a set of troubleshooting information (e.g., a troubleshooting article) associated with the user's issue. In other examples, a computing system can automatically identify the troubleshooting issue in response to receiving the support request. For example, the computing system can detect key words from the support request related to the issue and the computing cluster environment and select the troubleshooting article from the support information database that most closely matches the key words.

The troubleshooting article may include or be updated to include an embedded software diagnostic tool. The software diagnostic tool may be a script or an application that can be run on the diagnostic file to return results that may be relevant to the troubleshooting process. For example, the troubleshooting article may include documentation from a previous support request that states that this issue may be caused by an incorrectly configured parameter in the diagnostic file. The software diagnostic tool may be a script that locates and outputs the value of the parameter in the diagnostic file. When a link to the troubleshooting article is selected, the resulting webpage can be rendered to include the output from the script. The output may be color coded according to the value. For example, if the value of the parameter is incorrect, the value may be highlighted in red on the webpage to indicate that the parameter is incorrectly configured. This can assist the support personnel or the user in identifying the source and the solution to the issue. In some examples, the webpage can also be generated to display a section of code or a location of the section of code in the diagnostic file that triggered the output from the script. This can aid the support personnel in adjusting parameters for the computing environment to resolve the issue.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for generating dynamic troubleshooting documentation for a computing environment 102, according to one aspect of the present disclosure. The system 100 may include a user device 104, a computing device 106, a support information database 108, a tool database 110, and the computing environment 102 that are communicatively connected via a network 112, such as a local area network (LAN) or the Internet. The user device 104 and the computing device 106 may include one or more computing devices, such as servers, laptop computers, desktop computers, or mobile devices (e.g., a smartphone, tablet, or e-reader).

In some examples, the computing device 106 may be used by a support personnel for a service provider. The user device 104 may be used by a user that deploys the computing environment 102 with software or hardware provided by the service provider. The computing environment 102 may experience an issue that the user may be unable to resolve on their own. Thus, the user can submit a support request 114 for support in resolving the issue via the user device 104 to the computing device 106.

Various resources can be used by the computing device 106 or the support personnel to troubleshoot and resolve the issue. This can include the support information database 108 that stores troubleshooting information 116a-n. The troubleshooting information 116a-n may include articles, webpages, presentations, lists, tutorials, or any other type of troubleshooting content. Support personnel can create and edit troubleshooting information 116a-n that outlines a problem, environment, diagnostics, root cause, resolution, or any other information related to providing support for an issue with a computing environment. Troubleshooting and solution knowledge can therefore be captured using Knowledge-Centered Services (KCS) practices to be reused for subsequent troubleshooting. The support information database 108 can be searchable to identify relevant troubleshooting information 116a-n. For example, keyword searching can be performed to identify a troubleshooting article that most closely matches the issue or the environment for a new support request 114. Text for a selected troubleshooting information 116 can be displayed on a graphical user interface (GUI) 120 of the computing device 106.

The support personnel or computing device 106 may also access a tool database 110 of diagnostic software tools 118a-n that can aid in troubleshooting or resolving the issue. The diagnostic software tools 118a-n may include scripts or applications that can aid in automating identification of issues by applying specific checks on files. But this automation may take place outside of the typical KCS troubleshooting process. And, support personnel may have varying levels of expertise in different diagnostic software tools 118a-n, with some support personnel struggling to identify or use the diagnostic software tools 118a-n. To aid with capturing helpful troubleshooting information for the KCS process, relevant diagnostic software tools 118a-n can be embedded into the solution text of troubleshooting information 116a-n.

For example, the support request 114 may include a diagnostic file 122 uploaded by the user device 104. The diagnostic file 122 may include data captured from the computing environment 102. In some examples, the diagnostic file 122 may include configuration details, system information, and diagnostic information such as the running kernel version, loaded modules, system and service configuration files, log files, snapshots, images, and the like. Diagnostic software tools 118a-n can be applied to the diagnostic file 122 to output results that can be used in troubleshooting. For example, a first diagnostic software tool 118a may output error text in the diagnostic file 122, output configuration settings, check kernel versions, or the like. The first diagnostic software tool 118a may be integrated with a first troubleshooting information 116a using a templating approach (e.g., using the Python Jinja 2 library).

When a support request 114 without a diagnostic file 122 is received, the text of the troubleshooting information 116 can be rendered (e.g., as a webpage) via the GUI 120 as normal. But if a diagnostic file 122 is uploaded, the first diagnostic software tool 118a may be applied to the diagnostic file 122 to generate a result 126. An interface element 124 displaying the result 126 can be embedded in the rendering of the text of the first troubleshooting information 116a displayed by the GUI 120.

Figure 2:
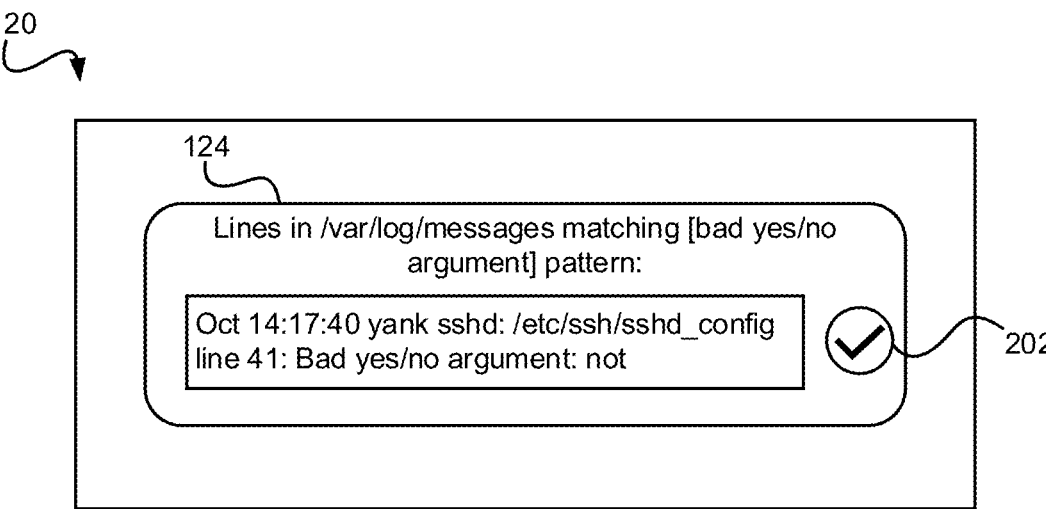
FIG. 2 is an example of a graphical user interface displaying dynamic troubleshooting information for a computing environment, according to one aspect of the present disclosure.

An example of the interface element 124 is illustrated in FIG. 2, which depicts an example of the GUI 120 displaying dynamic troubleshooting documentation for the computing environment 102, according to one aspect of the present disclosure. The GUI 120 may display document text for a troubleshooting article titled "Unable to start the SSHD service." The troubleshooting article can be updated with a diagnostic software tool that identifies bad yes/no arguments for the SSHD service in the diagnostic file 122. When the troubleshooting article is selected (e.g., on a webpage), the troubleshooting article can be rendered via the GUI 120 to include the output from the diagnostic software file.

For example, the GUI 120 for the webpage of the troubleshooting article can include an interface element 124 displaying the result for the diagnostic file 122. In the example depicted in FIG. 2, the interface element 124 may indicate that line 41 of the diagnostic file 122 matches the bad yes/no argument pattern. Because the software diagnostic tool identified a match, in some examples the interface element 124 may include a color or an icon 202 indicating the match. For example, the interface element 124 may have a green color or a checkmark icon 202 to indicate the match. If the diagnostic software tool had not identified any matching lines in the diagnostic file 122, the interface element 124 may be colored red or include a different icon. Any combination of colors, shading, sizing, icons, fonts, rendering style, or the like may be used to indicate success or failure of the result from the diagnostic software too. This can aid support personnel in troubleshooting the issue by clarifying the results of the diagnostic software tool.

Returning now to FIG. 1, in some examples the interface element 124 may additionally or alternatively display a portion of code 128 identified as a match by the first diagnostic software tool 118a. Using the example depicted in FIG. 2, the portion of code 128 may be line 41 of the diagnostic file 122. In some examples, the interface element 124 may include a link to the location of the portion of code 128 in the diagnostic file 122. These features can further aid support personnel in quickly identifying and resolving the issue for the computing environment 102. The support personnel may also edit the first troubleshooting information 116a with additional diagnostic software tools 118a-n as needed.

In some examples, if the computing environment 102 is deployed on servers hosted by the same service provider as the computing device 106, the computing device 106 may access one or more files 130 directly from the computing environment 102 in addition to or instead receiving the diagnostic file 122. For example, the computing device 106 may send an application-programming interface (API) call to an appropriate API 132 for the computing environment 102. The interface element 124 of the GUI 120 may additionally or alternatively display a result 126 from applying the first diagnostic software tool 118a to the one or more files 130 when the webpage for the first troubleshooting information 116a is rendered. In such examples, depending on results output by diagnostic software tools embedded in the first troubleshooting information 116a, the computing device 106 may automatically cause an update to the one or more files 130 to resolve the issue. For example, if one or more results 126 output from diagnostic software tools match expected results indicating that the source of the issue is a parameter with an incorrect value, the computing device 106 may automatically transmit an API call to the appropriate API 132 for the computing environment 102 to update the parameter in the one or more files 130 to the correct value.

In some examples, the user transmitting the support request 114 may be able to access troubleshooting information 116 with embedded diagnostic software tools 118. For example, the user device 104 may search the support information database 108 to identify a relevant troubleshooting article such as first troubleshooting information 116a. Or, the computing device 106 may automatically determine a most relevant troubleshooting information 116 (e.g., via keyword searching or based on the diagnostic file 122). The GUI 120 rendering a webpage for the first troubleshooting information 116a displaying the result 126 from applying the first diagnostic software tool 118a to the diagnostic file 122 can be output to the user device 104. The user may use the resulting webpage in a similar manner as the support personnel to identify or resolve the issue, but may not be able to edit the first troubleshooting information 116a.

Search results for the support information database 108 may also be annotated based on embedded diagnostic software tools 118. For example, the support personnel or user may do a keyword search of the support information database 108 to identify a relevant troubleshooting information 116 for the issue of the computing environment 102. Each of the troubleshooting articles listed in a search result may be annotated with icons indicating a result of their embedded diagnostic software tools 118a-n. For example, each diagnostic software tool 118 in troubleshooting information 116 may include a checkmark or a cross icon indicating whether or not that diagnostic software tool 118 identified a match in the diagnostic file 122.

This can aid the support personnel or the user in selecting the most appropriate troubleshooting information 116. For example, a set of troubleshooting information 116 may have two embedded diagnostic software tools. The first diagnostic software tool may determine if the computing environment 102 has the current version of Linux. The second diagnostic software tool may determine if the diagnostic file 122 includes certain error lines. The search result for the troubleshooting information 116 may include icons indicating that the first diagnostic software tool does not have a match for the diagnostic file 122 but the second diagnostic software tool has a match. Because the error lines may be more relevant to the issue than the version of Linux, the support personnel or user may be influenced to select the troubleshooting information 116 for support. And, if the support personnel determines that the troubleshooting information 116 is relevant to the support request 114, the support personnel may update the embedded diagnostic software tool 118 to check for additional versions of Linux. In some examples, the computing device 106 may automatically select troubleshooting information 116 with the highest number of matches in results 126 for diagnostic software tools 118.

While FIG. 1 depicts a specific arrangement of components, other examples can include more components, fewer components, different components, or a different arrangement of the components shown in FIG. 1. Additionally, any component or combination of components depicted in FIG. 1 can be used to implement the process(es) described herein.

Figure 3:
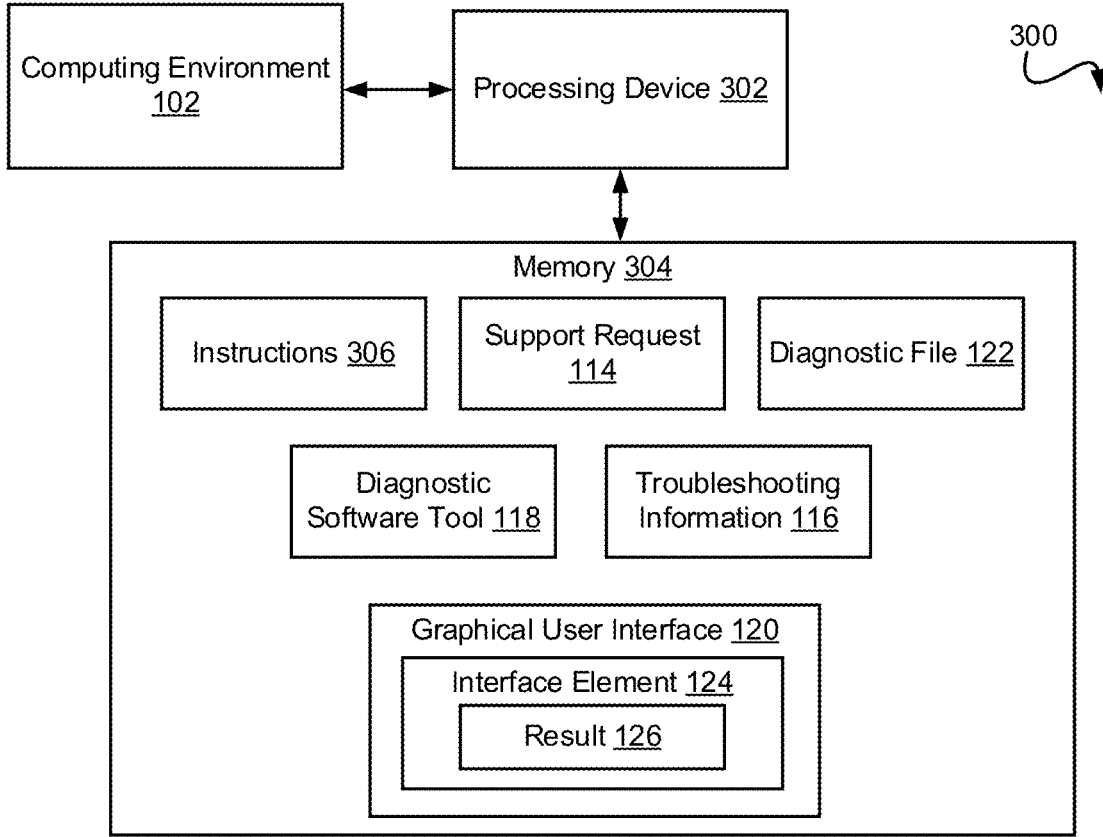
FIG. 3 is a block diagram of another example of a system for generating dynamic troubleshooting information for a computing system, according to one aspect of the present disclosure.

FIG. 3 is a block diagram of another example of a system 300 for generating dynamic troubleshooting documentation for a computing system, according to one aspect of the present disclosure. The system 300 includes a processing device 302 communicatively coupled to a memory 304. In some examples, the components of the system 300, such as the processing device 302 and the memory 304, may be part of a same computing device. In other examples, the processing device 302 and the memory 304 can be included in separate computing devices that are communicatively coupled.

The processing device 302 can include one processing device or multiple processing devices. Non-limiting examples of the processing device 302 can include a Field-Programmable Gate Array (FPGA), an application-specific integrated circuit (ASIC), and a microprocessor. The processing device 302 can execute instructions 306 stored in the memory 304 to perform computing operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory computer-readable medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can execute the instructions 206 to perform some or all of the functionality described herein. For example, the processing device 302 can receive a support request 114 for an issue with respect to a computing environment 102. The support request 114 can include a diagnostic file 122 for the computing environment 102. The processing device 302 can identify, in response to receiving the support request 114, troubleshooting information 116 associated with the issue or the computing environment 102 in a support information database 108. The processing device 302 can embed a diagnostic software tool 118 associated with the issue or the computing environment 102 within the troubleshooting information 116. The processing device 302 can output a graphical user interface (GUI) 120 displaying the troubleshooting information 116 and an interface element 124 displaying a result 126 generated by applying the diagnostic software tool 118 to the diagnostic file 122 for the computing environment 102 for use in resolving the issue.

FIG. 4 is a flowchart of a process 400 for generating dynamic troubleshooting documentation for a computing system, according to one aspect of the present disclosure. In some examples, the processing device 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIGS. 1-3.

At block 402, the processing device 302 can receive a support request 114 for an issue with respect to a computing environment 102, the support request 114 comprising a diagnostic file 122 for the computing environment 102. For example, the issue may involve a service in the computing environment 102 failing to operate as expected. The diagnostic file 122 may include a snapshot or image of the computing environment 102. In some examples, the diagnostic file 122 may also include one or more files 130 remotely accessed from the computing environment 102 via an application-programming interface 132.

At block 404, the processing device 302 can identify, in response to receiving the support request 114, troubleshooting information 116 associated with the issue or the computing environment 102 in a support information database 108. For example, the processing device 302 may perform a keyword search of the support information database 108 using key words from the support request 114 or the diagnostic file 122. The search result that most closely matches the issue or the configuration of the computing environment 102 (e.g., the software services, host machines, operating system, or the like) may be selected by a support personnel, a user, or automatically selected by the processing device 302. Or, if the processing device 302 does not identify troubleshooting information 116 associated with the issue or the computing environment 102 in the support information database 108, the processing device 302 can generate a new set of troubleshooting information 116 to store in the support information database 108.

At block 406, the processing device 302 can embed a diagnostic software tool 118 associated with the issue or the computing environment 102 within the troubleshooting information 116. For example, the diagnostic software tool 118 may be an application that identifies whether a configuration setting for the service that is experiencing the issue in the computing environment 102 matches an expected value. The diagnostic software tool 118 can be embedded within the troubleshooting information 116 such that when a webpage for the troubleshooting information 116 is rendered (e.g., when a user selects the troubleshooting information 116 from the search results), an interface element 124 displaying a result 126 for the diagnostic software tool 118 is included in the webpage. If a diagnostic file 122 is not received from the user device 104 (or if one or more files 130 are not accessed from the computing environment 102), the webpage may render without the interface element 124.

At block 408, the processing device 302 can output a graphical user interface (GUI) 120 displaying the troubleshooting information 116 and comprising an interface element 124 displaying a result 126 generated by applying the diagnostic software tool 118 to the diagnostic file 122 for the computing environment 102 for use in resolving the issue. The appearance of the interface element 124 may depend on the result 126. For example, the processing device 302 may determine a color or an icon for the interface element 124 based on the result. If the result 126 matches an expected result for the diagnostic software tool 118, the processing device 302 may identify a color or an icon associated with the match (e.g., green for a match). Or, if the result 126 does not match, another color or icon may be identified (e.g., red for no match).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a non-transitory computer-readable memory comprising instructions that are executable by the processing device for causing the processing device to:
  receive a support request for an issue with respect to a computing environment, the support request comprising a diagnostic file for the computing environment;
  identify, in response to receiving the support request, a webpage comprising troubleshooting information associated with the issue or the computing environment in a support information database;
  embed a diagnostic software tool associated with the issue or the computing environment within the webpage, wherein the embedded diagnostic software tool is configured to automatically generate a result based on the diagnostic file in response to a selection of the webpage;
  output, in response to the selection of the webpage, a graphical user interface displaying the webpage and comprising an interface element displaying the result inserted within a depiction of the troubleshooting information;
  determine, by comparing the result to a prior source of the issue, that the issue is caused by an incorrect parameter value in one or more files from the computing environment; and
  responsive to determining that the issue is caused by the incorrect parameter value, automatically update the incorrect parameter value in the one or more files to a correct parameter value.

2. The system of claim 1, wherein the memory further comprises instructions that are executable by the processing device for causing the processing device to:
access, via an application-programming interface, the one or more files from the computing environment, wherein the interface element is configured to display another result generated by applying the diagnostic software tool to the one or more files accessed from the computing environment.

3. The system of claim 1, wherein the memory further comprises instructions that are executable by the processing device for causing the processing device to output the graphical user interface comprising the interface element by:

determining, based on the result generated by applying the diagnostic software tool to the diagnostic file, a color or an icon for the interface element; and outputting the graphical user interface that comprises the color or the icon applied to the interface element for the result.

4. The system of claim 3, wherein the memory further comprises instructions that are executable by the processing device for causing the processing device to determine the color or the icon for the interface element by:

determining that the result matches an expected result for the diagnostic software tool; and identifying the color or the icon associated with a match between the result and the expected result.

5. The system of claim 4, wherein the memory further comprises instructions that are executable by the processing device for causing the processing device to:

identify a portion of code in the diagnostic file associated with the match between the expected result and the result generated by applying the diagnostic software tool to the diagnostic file; and output the graphical user interface that displays the portion of code in the diagnostic file associated with the match.

6. The system of claim 1, wherein the memory further comprises instructions that are executable by the processing device for causing the processing device to, in response to receiving the support request:

determine that the support information database does not comprise troubleshooting information associated with the issue or the computing environment; and generate new troubleshooting information in the support information database comprising the diagnostic software tool associated with the issue or the computing environment in response to determining that the support information database does not comprise troubleshooting information associated with the issue or the computing environment.

7. The system of claim 1, wherein the support request is received from a user device associated with the computing environment, and wherein the memory further comprises instructions that are executable by the processing device for causing the processing device to output the graphical user interface comprising the interface element within the troubleshooting information for display to the user device.

8. A method comprising:

receiving, by a processing device, a support request for an issue with respect to a computing environment, the support request comprising a diagnostic file for the computing environment;

identifying, by the processing device and in response to receiving the support request, a webpage comprising troubleshooting information associated with the issue or the computing environment in a support information database;

embedding, by the processing device, a diagnostic software tool associated with the issue or the computing environment within the webpage, wherein the embedded diagnostic software tool is configured to automatically generate a result based on the diagnostic file in response to a selection of the webpage;

outputting, by the processing device and in response to the selection of the webpage, a graphical user interface displaying the webpage and comprising an interface element displaying the result inserted within a depiction of the troubleshooting information;

determining, by the processing device and by comparing the result to a prior source of the issue, that the issue is caused by an incorrect parameter value in one or more files from the computing environment; and responsive to determining that the issue is caused by the incorrect parameter value, automatically updating, by the processing device, the incorrect parameter value to a correct parameter value.

9. The method of claim 8, further comprising:

accessing, via an application-programming interface, the one or more files from the computing environment, wherein the interface element is configured to display another result generated by applying the diagnostic software tool to the one or more files accessed from the computing environment.

10. The method of claim 8, wherein outputting the graphical user interface comprising the interface element further comprises:

determining, based on the result generated by applying the diagnostic software tool to the diagnostic file, a color or an icon for the interface element; and outputting the graphical user interface that comprises the color or the icon applied to the interface element for the result.

11. The method of claim 10, wherein determining the color or the icon for the interface element further comprises:

determining that the result matches an expected result for the diagnostic software tool; and identifying the color or the icon associated with a match between the result and the expected result.

12. The method of claim 11, further comprising:

identifying a portion of code in the diagnostic file associated with the match between the expected result and the result generated by applying the diagnostic software tool to the diagnostic file; and outputting the graphical user interface that displays the portion of code in the diagnostic file associated with the match.

13. The method of claim 8, further comprising, in response to receiving the support request:

determining that the support information database does not comprise troubleshooting information associated with the issue or the computing environment; and generating new troubleshooting information in the support information database comprising the diagnostic software tool associated with the issue or the computing environment in response to determining that the support information database does not comprise troubleshooting information associated with the issue or the computing environment.

14. The method of claim 8, wherein the support request is received from a user device associated with the computing environment, and wherein the method further comprises:

outputting the graphical user interface comprising the interface element within the troubleshooting information for display to the user device.

15. A non-transitory computer-readable medium comprising program code that is executable by a processing device for causing the processing device to:

receive a support request for an issue with respect to a computing environment, the support request comprising a diagnostic file for the computing environment;

identify, in response to receiving the support request, a webpage comprising troubleshooting information associated with the issue or the computing environment in a support information database;

embed a diagnostic software tool associated with the issue or the computing environment within the webpage, wherein the embedded diagnostic software tool is configured to automatically generate a result based on the diagnostic file in response to a selection of the webpage;

output, in response to the selection of the webpage, a graphical user interface displaying the webpage and comprising an interface element displaying the result inserted within a depiction of the troubleshooting information;

determine, by comparing the result to a prior source of the issue, that the issue is caused by an incorrect parameter value in one or more files from the computing environment; and responsive to determining that the issue is caused by the incorrect parameter value, automatically update the incorrect parameter value to a correct parameter value.

16. The non-transitory computer-readable medium of claim 15, wherein the program code is further executable by the processing device for causing the processing device to:

access, via an application-programming interface, the one or more files from the computing environment, wherein the interface element is configured to display another result generated by applying the diagnostic software tool to the one or more files accessed from the computing environment.

17. The non-transitory computer-readable medium of claim 15, wherein the program code is further executable by the processing device for causing the processing device to output the graphical user interface comprising the interface element by:

determining, based on the result generated by applying the diagnostic software tool to the diagnostic file, a color or an icon for the interface element; and outputting the graphical user interface that comprises the color or the icon applied to the interface element for the result.

18. The non-transitory computer-readable medium of claim 17, wherein the program code is further executable by the processing device for causing the processing device to determine the color or the icon for the interface element by:

determining that the result matches an expected result for the diagnostic software tool; and identifying the color or the icon associated with a match between the result and the expected result.

19. The non-transitory computer-readable medium of claim 18, wherein the program code is further executable by the processing device for causing the processing device to:

identify a portion of code in the diagnostic file associated with the match between the expected result and the result generated by applying the diagnostic software tool to the diagnostic file; and output the graphical user interface that displays the portion of code in the diagnostic file associated with the match.

20. The non-transitory computer-readable medium of claim 15, wherein the program code is further executable by the processing device for causing the processing device to, in response to receiving the support request:

determine that the support information database does not comprise troubleshooting information associated with the issue or the computing environment; and generate new troubleshooting information in the support information database comprising the diagnostic software tool associated with the issue or the computing environment in response to determining that the support information database does not comprise troubleshooting information associated with the issue or the computing environment.

* * * * *